April 7, 1970    R. B. FRIDLEY    3,504,486
TRUNK SHAKER FOR ATTACHMENT TO A TREE
Filed Aug. 21, 1968    4 Sheets-Sheet 1
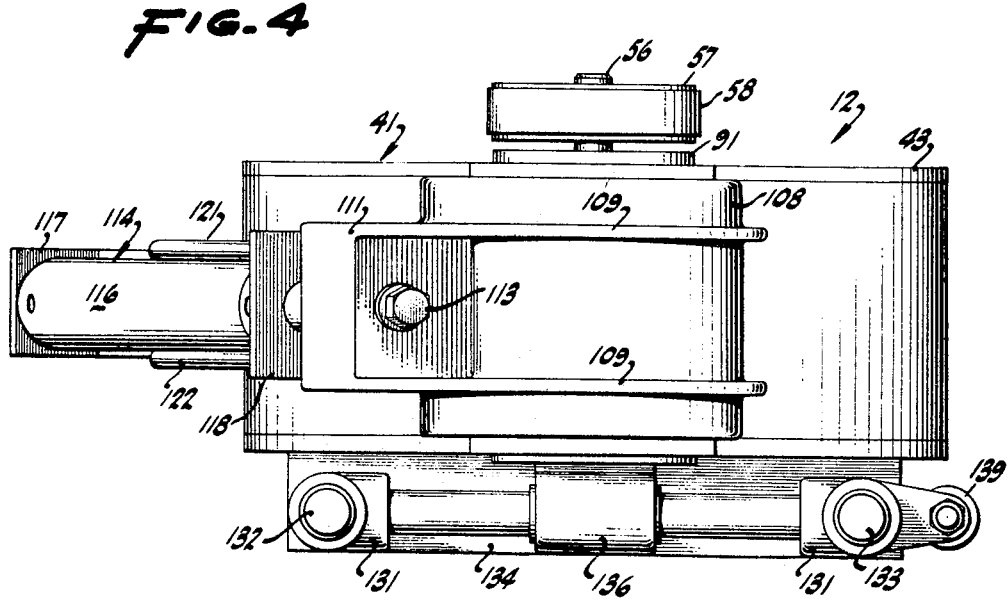
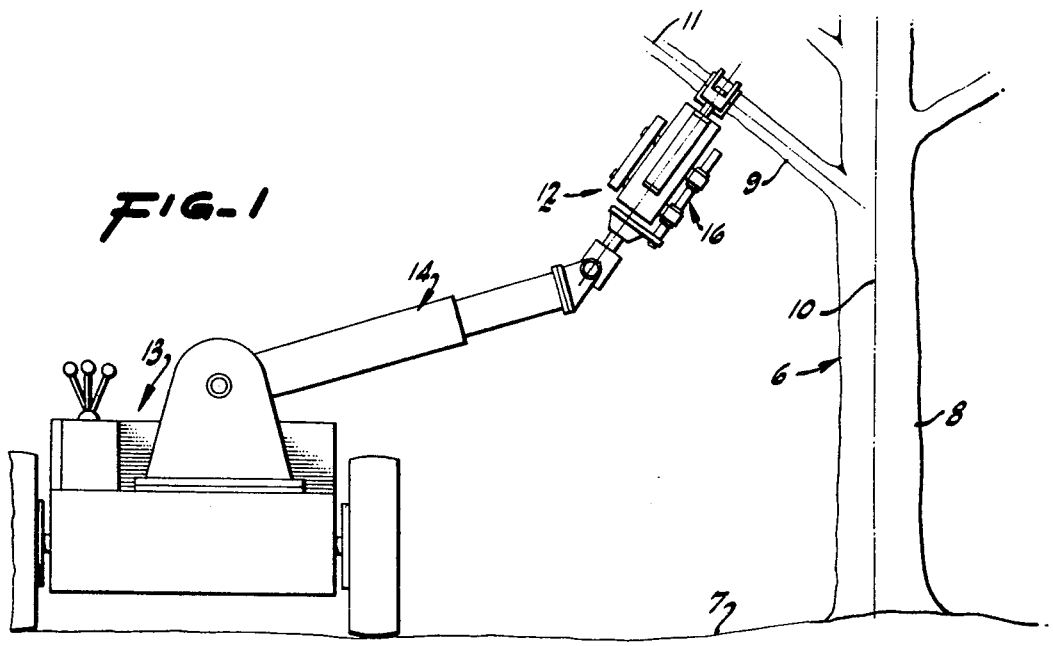
INVENTOR.
ROBERT B. FRIDLEY
BY
Lothrop & West
ATTORNEYS April 7, 1970 R. B. FRIDLEY 3,504,486
TRUNK SHAKER FOR ATTACHMENT TO A TREE
Filed Aug. 21, 1968 4 Sheets-Sheet 2

FIG-2

INVENTOR.
ROBERT B. FRIDLEY
BY Lothrop & West
ATTORNEYS

April 7, 1970     R. B. FRIDLEY     3,504,486
TRUNK SHAKER FOR ATTACHMENT TO A TREE
Filed Aug. 21, 1968     4 Sheets-Sheet 3
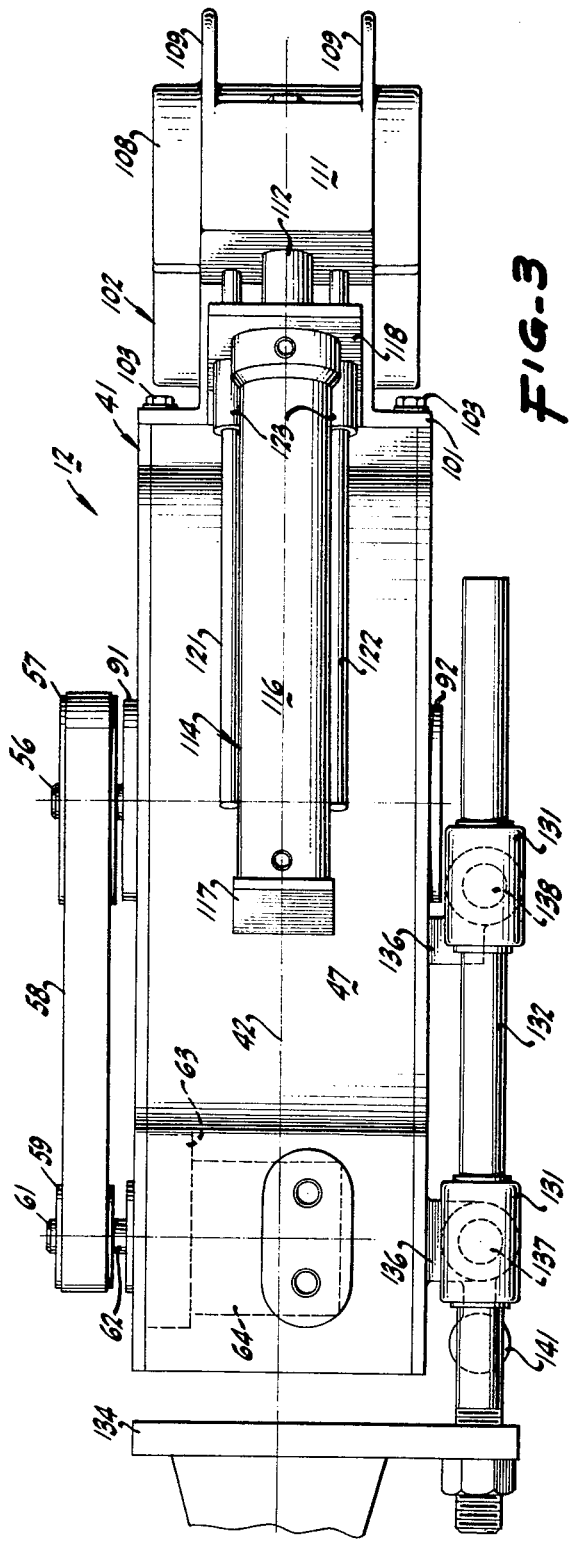
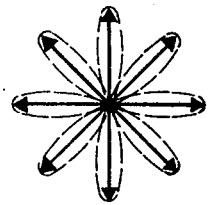
FIG. 6C
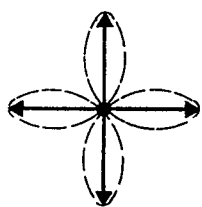
FIG. 6B
FIG. 6A
INVENTOR.
ROBERT B. FRIDLEY
BY
Lothrop & West
ATTORNEYS April 7, 1970   R. B. FRIDLEY   3,504,486
TRUNK SHAKER FOR ATTACHMENT TO A TREE
Filed Aug. 21, 1968   4 Sheets-Sheet 4

INVENTOR.
ROBERT B. FRIDLEY
BY
Lothrop & West
ATTORNEYS

United States Patent Office 3,504,486
Patented Apr. 7, 1970

3,504,486
TRUNK SHAKER FOR ATTACHMENT TO A TREE
Robert B. Fridley, Davis, Calif., assignor to The Regents of the University of California, Berkeley, Calif.
Continuation-in-part of application Ser. No. 477,819, Aug. 6, 1965. This application Aug. 21, 1968, Ser. No. 754,319
The portion of the term of the patent subsequent to Oct. 22, 1985, has been disclaimed and dedicated to the Public
Int. Cl. A01g 19/00
U.S. Cl. 56—328                                         1 Claim

ABSTRACT OF THE DISCLOSURE

A trunk shaker for attachment to a tree is mounted on a mobile boom and includes a frame housing carrying a motor driving a crank shaft journalled in the frame for rotation about a first axis. A crank pin to which a weight is fastened is journalled in the crank shaft for relative rotation about a second, parallel axis. A sprocket on the crank pin is connected by a chain to a sprocket of a predetermined diameter on the crank shaft so that the weight moves in various straight lines and shakes a tree clamp mounted on the frame in corresponding lines usually defining a geometrical pattern depending upon the chosen ratio of the sprocket diameters and including a bodily rotation of the line pattern about the first axis and correspondingly about the tree trunk axis.

---

This application is a continuation in part of my application entitled "Limb Shaker for Attachment to a Tree," Ser. No. 477,819 filed Aug. 6, 1965 now Patent 3,406,508 and assigned to the assignee hereof.

My invention relates to devices which are utilized for artificially or mechanically shaking the limbs or trunk of a tree in a fashion designed to dislodge the produce or fruit from the tree for harvesting purposes.

In recent years the gathering of fruit from trees has been increasingly effectuated by mechanical means as distinguished from manual labor. Reference to fruit is intended to refer not only to items normally classified as fruit such as prunes or plums, but also to nuts such as almonds and the like, and in fact is intended to include all arrangements in which the produce of a tree or shrub can economically be dislodged for harvesting purposes by shaking the structure of the tree or shrub.

In past years some progress has been made in supplying mechanical shakers which are attached in various fashions to the trunk, branches or limbs of trees in order to impart a vibratory shaking movement thereto of sufficient effect to remove the fruit from the tree. Some of these shakers are arranged with various vibratory modes and are arranged to operate at different amplitudes and frequencies. They are usually temporarily positioned at desired points on the tree trunk or limbs and are temporarily secured in the selected positions in order that the vibration of the machine can be transmitted without substantial loss to the tree. Difficulties sometimes arise in that it is awkward to position the vibrating structure because of the growth habit of the tree, and it is also difficult to arrange the tree shaker in such a manner that no injury is done to the tree itself, particularly to the bark and to the cambium layer.

It is therefore an object of the invention to provide a trunk or limb shaker for attachment to a tree which is so shaped and is so arranged that it can be utilized in connection with most trees of however compact growth and can be positioned in the desired attitude.

Another object of the invention is to provide a trunk or limb shaker which readily can be adapted for attachment to a tree trunk or limb with the main portion of the shaker extending substantially perpendicular to the trunk or limb.

Another object of the invention is to provide a trunk or limb shaker having a mechanical form of vibratory device effective to produce its major oscillations primarily in any of several predetermined directions perpendicular to the axis of the trunk or limb to which the device is attached.

Another object of the invention is to provide a trunk or limb shaker in which the tree clamping mechanism can be positioned and removed without injury to the tree and which will transmit vibrations of the shaker mechanism to the tree without injury thereto.

Another object of the invention is to provide a trunk or limb shaker which is rugged and sturdy and can withstand protracted use in the field without any substantial service or mechanical attention.

An additional object of the invention is to provide a trunk or limb shaker of an improved character.

Other objects together with the foregoing are attained in the embodiment of the invention described in the accompanying description and illustrated in the accompanying drawings, in which:

FIGURE 1 is a diagrammatic showing of the trunk or limb shaker pursuant to the invention attached to a tree limb and effective to shake the limb;

FIGURE 2 is a plan, certain portions being shown in phantom, of a trunk or limb shaker constructed in accordance with the invention;

FIGURE 3 is a side elevation of the structure shown in FIGURE 2;

FIGURE 4 is an end elevation of the structure shown in FIGURE 2;

FIGURES 6A, 6B and 6C are diagrams of three of several force patterns concentric with the shaker crank shaft axis and resulting from the use of different, predetermined ratios of sprocket diameters.

Figure 5:
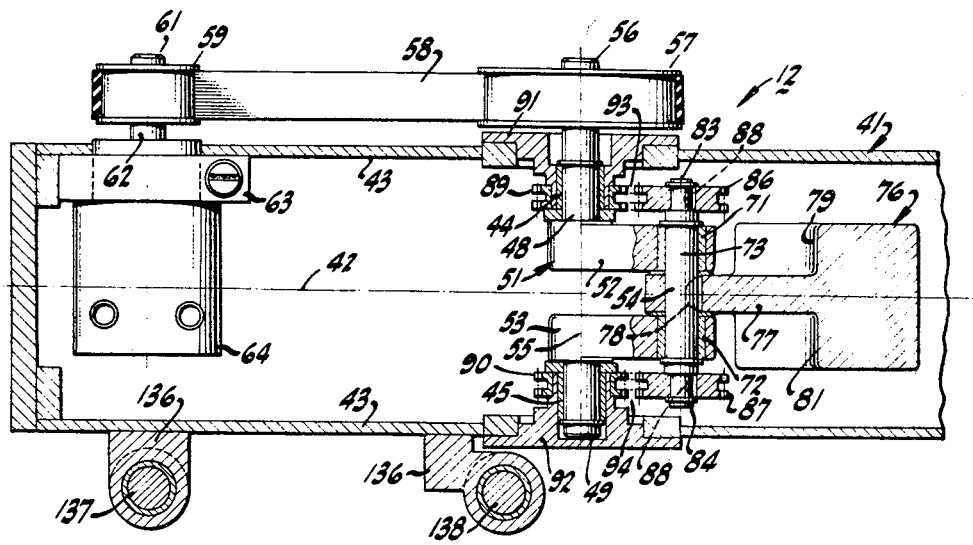
FIGURE 5 is a fragmentary sectional view on the line 5—5 of FIGURE 2 but showing a different sprocket diameter ratio than that of FIGURE 2.

While the trunk or limb shaker can be utilized in a number of different ways, it has, for example, most successfully been utilized in connection with a tree 6 growing from the ground 7 and having a trunk 8 from which a number of branches 9 extend. The trunk has an axis 10. The branches in various trees are disposed and extended in various fashions, but it is considered for present purposes that the general direction of extent of a branch or a substantial portion thereof is along an assumed axis, such as 11. This reference to axes 10 and 11 is primarily for use in describing the positioning and orienting of the mechanism since there is variation from tree to tree and usually there is no geometric exactness.

Customarily, the trunk or limb shaker 12 is brought to a position of use on a powered vehicle 13 movable over the ground 7 and having a boom 14 that can be moved about and variously positioned so as to move the shaker 12 in a comparable fashion. For initially positioning the shaker, the boom 14 and the shaker are provided with a lock mount 16. The lock mount is arranged so that when locked the shaker 12 is substantially immobile within itself. By appropriately orienting the boom, the shaker 12 can be positioned so as to extend in a plane that is perpendicular to the axis 10 of the trunk or the axis 11 of the limb or branch 9. The lock mount is only for initial positioning, however, since after the shaker has been appropriately located and has engaged the trunk or limb, the lock mount 16 is released. Substantially no restraint is thereafter imposed within the shaker. The shaker can move quite freely within itself and does not transmit any substantial force or motion back to the boom 14.

The shaker is made up of an elongated frame 41 of generally rectangular configuration approximately three to four times as long as it is wide so that the frame can be considered as elongated in the direction of its own axis 42. The frame includes a largely circular box with appropriate cover plates 43 thereon affording access to the interior.

Mounted in primary journals 44 and 45 (FIGURE 5) in the cover plates spanning the side walls 46 and 47 of the frame are the shaft bearing portions 48 and 49 of a crank shaft 51. The crank shaft in appearance, although not in detailed construction, is similar to the usual single throw crank shaft and includes a pair of crank cheeks 52 and 53 as well as a crank pin 54, all arranged for rotation about a first transverse axis 55 normal to the longitudinal axis 42. At one end the crank shaft extends to the exterior of the frame and has a hub 56 carrying a pulley 57 with which a belt 58 is engaged. The belt is preferably of the toothed variety and constitutes a part of a coupling means for joining the pulley 57 with a pulley 59 fast on the outboard end 61 of a motor shaft 62. This extends through a mounting 63 in the plate 43 to a hydraulic or electric motor 64 located within the interior of the elongated frame.

The motor 64, preferably hydraulic, is supplied with energy by leads extending along the boom 14 from a suitable source of power (not shown) on the vehicle 13. When the motor 64 rotates, it produces a corresponding rotation of the crank shaft through the belt 58. The particular ratio of speeds of rotation of the motor and of the crank shaft is not critical, but the pulley sizes illustrated are typical. In most every instance, the motor 64 is of variable speed so that the crank shaft can be rotated throughout a relatively wide range of speeds.

The crank pin 54, although similar in position to and in certain of its functions comparable to the usual crank pin, differs in the present instance. Instead of being fixed with respect to the crank cheeks 52 and 53, the crank pin is mounted in each of the crank cheeks by means of secondary journals 71 and 72. The crank pin is freely rotatable in the journals with respect to a second, transverse axis 73 parallel to the axis 55. With this arrangement, the crank pin 54 can rotate around its own axis 73 and the crank shaft as a whole can rotate around the axis 55 with respect to the frame. The crank pin 54 carries an eccentric weight 76 having a central tongue 77 extending between the crank cheeks 52 and 53 and made fast to the crank pin 54 by means of a key 78. The inertia weight or eccentric weight 76 is preferably approximately cylindrical for much of its configuration and is provided with crescent-shaped cut-away portions 79 and 81.

Particularly in accordance with the invention, the crank shaft and the crank pin are coupled in such a way that the crank pin 54 makes a predetermined number of whole or fractional rotations about its own axis 73 as the crank shaft 51 makes one rotation about its axis 55. This is accomplished by providing extensions 83 and 84 of the crank pin on the outboard sides of the crank cheeks 52 and 53 carrying a pair of duplex sprockets 86 and 87 each provided with a key 88 for securing it to the crank pin.

Aligned with each of the duplex sprockets 86 and 87 is the individual one of a pair of duplex sprockets 89 and 90 concentric with the first transverse axis 55. The sprockets 89 and 90 have a diameter bearing a predetermined ratio (such as ½, 1, 2, 3) to the diameter of the sprockets 86 and 87. The sprockets 89 and 90 although concentric with the crank shaft are not fastened thereto, but rather are fixed on stationary quills 91 and 92 extending inwardly from the cover plates 43 of the elongated frame 41. Trained around the duplex sprockets 89 and 86 is a duplex chain 93, and trained around the duplex sprockets 90 and 87 is a similar duplex chain 94.

With this arrangement, when the motor 64 is rotated to revolve the crank shaft 51, the crank pin 54 is moved in a circular path around the first transverse axis 55, but at the same time the duplex sprockets 86 and 87 move in a planetary fashion around the stationary sprockets 89 and 90. Since the various sprockets are connected by their respective chains 93 and 94, and since the diameters of the sprockets bear a predetermined ratio, the net result is to rotate the crank pin 54 in such a way that the eccentric weight 76 travels always in a predetermined path within the elongated frame 41. The geometrical center of the circular portion of the eccentric weight 76, especially as seen in FIGURE 3, always travels in a predetermined path making a pattern of force such as the representative paths shown in FIGURES 6A, 6B and 6C.

As the crank shaft rotates, the eccentric weight 76 may occupy a location near the right-hand end of the frame 41 as seen in FIGURES 2 and 3. As the crank rotates through a part of a turn, the crank pin rotates through a part of a turn, the crank pin rotates through a proportional part of a turn so that the eccentric weight 76 then nests quite closely with the crank cheeks 52 and 53, the lunar cut-out portions 79 and 81 accommodating the crank cheeks under these conditions. As the crank shaft continues to turn about the axis 55 through the next part of a rotation, the chosen ratio of drive moves the eccentric weight 76 so that it occupies another extreme position remote from the axis 56 as seen in FIGURES 2 and 3. For some diameter ratios the pattern of forces is simple, such as a straight line, a quatrefoil or the like, retracing itself in a simple way. For other diameter ratios there may be in effect, a rotating pattern of forces centered on the axis 56 and corresponding on the axes 10 or 11 for trunk or limb attachment, respectively.

The operation of this structure, therefore is effective repeatedly to translate a reciprocating mass in predetermined patterns within the elongated frame. There are unbalanced forces acting out of the direction of the axis 42, although the unbalance is small when the crank cheeks 52 and 53 are in positions substantially occupying the cut-outs 79 and 81. Otherwise, the crank cheeks add to the unbalanced forces. Nearly all of the applied power produces oscillatory or vibratory motion.

When this crank shaft and eccentric weight structure is in operation, the frame 41, being the reacting body, is similarly vibrated at the same frequency and approximately at the same amplitude (when free) but in the reverse sense to or in a different phase relationship to the direction of vibration of the interior structure.

Advantage is taken of the vibratory structure for shaking the tree trunk or limb. Mounted on an end wall 101 of the frame spanning the distance between the side walls 46 and 47 is a first clamp member 102. This is a detachable structure held onto the frame 41 by fasteners 103 and is contoured to afford an arcuate base 104 somewhat larger than the arcuate curvature of the trunk or limb to be encountered. In a representative instance, the trunk may be eight inches in diameter and the usual limbs are from four to five inches in diameter at the point of attachment of the shaker. Within the arcuate base 104 is mounted a primary clamping pad 106 usually of some resilient, accommodating material which can engage the rough bark of the tree with substantially a radial motion and without causing any injury thereto.

Arranged in confronting relationship with the pad 106 is a similar, secondary resilient clamping pad 107 of a complementary arcuate contour borne by an arcuate base plate 108 reinforced by a pair of arcuate fins 109. When positioned substantially around a trunk or limb of the recognized size range, the arcuate pads 106 and 107 occupy something more than the opposite quadrants of an annular figure and transmit shaking forces in all directions normal to the trunk or limb axis.

In order approximately to mount and move the secondary clamp member 108 with respect to the primary clamp member 104, the secondary member is provided with an anchoring boss 111 secured to the end of a plunger 112 by a fastening arrangement 113. The plunger 112 is part of a hydraulically expansible chamber mechanism 114 including a cylinder 116 within which the plunger 112 is reciprocable. The cylinder 116 is provided with mounting structures 117 and 118 to fasten it to the frame 41 so that the cylinder remains stationary but the plunger 112 can be expelled therefrom and retracted thereinto.

So that the plunger 112 does not rotate within the cylinder, the plunger boss 111 is provided with a pair of guide rods 121 and 122. The rods operate in guide blocks 123 secured to the frame 41. Preferably the cylinder 116 is provided with hydraulic pressure fluid under manual control from a remote source (not shown).

When the plunger 112 is expelled by pressure fluid within the cylinder, the secondary clamp member is backed away from the primary clamp member and the distance between the closest parts thereof is sufficient so that the clamps can be located on opposite sides of a trunk or limb. It is important that the clamp members be arranged with their arcuate or circular cylindrical surfaces substantially concentric with the axis 10 of the trunk or the axis 11 of the tree limb before the clamps are engaged therewith. Also, it is an important feature that the mechanism can be arranged so that the axis 42 lies as nearly as possible perpendicular to the axis 10 of the trunk or the axis 11 of the tree limb when the two clamp elements are engaged.

As soon as the shaker is so arranged at a right angle to or perpendicular to the particular axis and at an appropriate point along the height of the trunk or the length of the limb, then the hydraulic fluid to the cylinder 116 is valved so that the second clamp member 108 is moved toward the first clamp member 104. With this orientation of the parts, the pads 106 and 107 engage the tree bark and impose only approximately radial and no substantial tangential forces on the bark. It has been found by experiment that movement of the clamps onto the tree with large components tangent to the trunk or limb or large components longitudinally of the trunk or limb is highly deleterious. It has also been found that to position a shaker at other than a right angle to the axes 10 or 11 imposes longitudinal forces on the bark which tend to injure the bark, to separate the cambium and to leave cracks through which infection may attack the tree.

After the clamp members have been arranged at the proper perpendicular attitude, they are caused to approach each other closely enough so that they grip firmly but impose not more than a predetermined unit force on the tree bark. This force is limited by limiting the pressure of the hydraulic fluid within the cylinder 116. As an example, this force should not exceed two hundred fifty pounds per square inch of area of the pads 106 and 107 considered individually.

After the shaker has been so clamped onto the trunk or a limb and after the lock mount has been completely freed and released so that the shaker is quite free to move then the motor 64 is energized. This produces a rapid vibration of the elongated frame 41 as a result of the predetermined pattern of motion of the eccentric weight 76 and in turn produces an effective shaking force on the tree trunk or limb. In this fashion it is possible, particularly by varying the speed of the motor 64 so that the tree trunk or limb is shaken at its resonant frequency, to dislodge all or substantially all of the fruit therefrom without any injury whatsoever to the tree bark.

At the conclusion of the shaking operation, the motor 64 is shunt off and the hydraulic chamber 114 is expanded to free the clamps. At about this time the lock mount 16 is again made rigid to stabilize the shaker. The shaker mount includes blocks 131 separate from the frame 41 and slidably supported on two parallel, longitudinal rods 132 and 133. The rods are anchored to an end plate 134 near the end of the boom 14. Bosses 136 projecting from the frame 41 between the rods 132 and 133 engage cross rods 137 and 138 carried in the blocks 131. In this way, a mounting providing for universal, planar movement of the frame 41 is afforded.

The lock mount 16 includes a pair of hydraulic cylinders 139 and 141 secured at their ends to one of the blocks 131 and to one of the bosses 136. The hydraulic cylinders are connected in a hydraulic circuit (not shown) by hose pairs 143 and 144. When the hydraulic circuit is open so that the piston rods of the cylinders 139 and 141 can move freely, the frame 41 is free to move in all directions with respect to the boom 14, but when one or both of the hydraulic circuits is closed, movement of the piston rods is hydraulically blocked and the frame 41 is held fixed with respect to the boom 14.

Sometimes, as a variation, the tree trunk or tree limb is not directly engaged, but is provided with a permanent bolt or lag screw projecting a convenient distance and preferably provided with a spherical head. In that instance, the clamps are adapted to grip the screw or bolt head and the shaker is oriented to shake the limb or tree trunk in various directions about its axis and with the principal shaking forces perpendicular thereto.

What is claimed is:

1. In a trunk shaker for attachment to a tree and having an elongated frame, a primary pad, means for mounting said primary pad on one end of said frame, a clamp member, a secondary pad on said clamp member means on said frame for moving said clamp member to move said secondary pad toward and away from said primary pad, the combination of a crank shaft, means for mounting said crank shaft in said frame for rotation relative to said frame about a first transverse axis, a crank pin, means for journalling said crank pin on said crank shaft for rotation relative to said crank shaft about a second transverse axis, a motor on said frame, means for coupling said motor to said crank shaft for rotating said crank shaft about said first transverse axis, a drive train between said crank shaft and said crank pin for rotating said crank pin about said second transverse axis at a ratio to the speed of rotation of said crank shaft in the ranges of about ½ to less than 2 and greater than 2 to produce a rotating pattern of resulting sequential forces centered on said first transverse axis but sequentially extending in different radial directions, and a weight fastened only on said crank pin and eccentric with respect to said second transverse axis.

References Cited

UNITED STATES PATENTS 3,406,508   10/1968   Fridley _____ 56—328

ROBERT E. BAGWILL, Primary Examiner